United States Patent [19]
Horvath et al.

[11] 3,894,719
[45] July 15, 1975

[54] WATER SOFTENER VALVE

[75] Inventors: John F. Horvath, Milwaukee, Wis.; Chester R. Nickols, Sycamore, Ill.

[73] Assignee: Aqua-Chem, Inc., Milwaukee, Wis.

[22] Filed: Dec. 17, 1973

[21] Appl. No.: 424,957

Related U.S. Application Data

[62] Division of Ser. No. 196,621, Nov. 8, 1971, Pat. No. 3,794,061.

[52] U.S. Cl. ......... 251/231; 137/636.1; 137/DIG. 2
[51] Int. Cl. ................................................ F16k 31/44
[58] Field of Search ............ 251/231; 137/391, 449, 137/625.42, 627.5, 628, 636.1, DIG. 2

[56] References Cited
UNITED STATES PATENTS

| | | | |
|---|---|---|---|
| 1,024,175 | 4/1912 | Boye | 137/DIG. 2 |
| 2,075,917 | 4/1937 | Vorech | 137/636.1 |
| 2,452,295 | 10/1948 | Elliott | 137/636.1 |
| 2,964,311 | 12/1960 | Stelzer | 137/636.1 X |
| 3,543,797 | 12/1970 | McNutt et al. | 137/628 |

Primary Examiner—Martin P. Schwadron
Assistant Examiner—David R. Matthews
Attorney, Agent, or Firm—Fred Wiviott

[57] ABSTRACT

A water softener control valve has a number of cam operated valves each of which includes a ball located at a port. A lever is associated with each ball and lever movement by the cams unseats the balls to open the ports. The ports are located in a common, generally horizontal wall and internal generally vertical walls associated with the ports define channeling through which water is directed in achieving the service, backwash, brine slow rinse, and fast rinse cycles of the water softener, and in addition the brine tank water refill after the mineral bed of the water softener has been regenerated. Water pressure urges the balls toward their respective ports and holds the balls seated in the ports. One port is exposed, during the regeneration portion of the water softener program, to both return flow from the mineral tank on one side of the port and service flow to the service outlet on the other side. That port has a ball on both sides of the port to insure closure of the port and isolation of the flow on both sides of the port.

6 Claims, 11 Drawing Figures

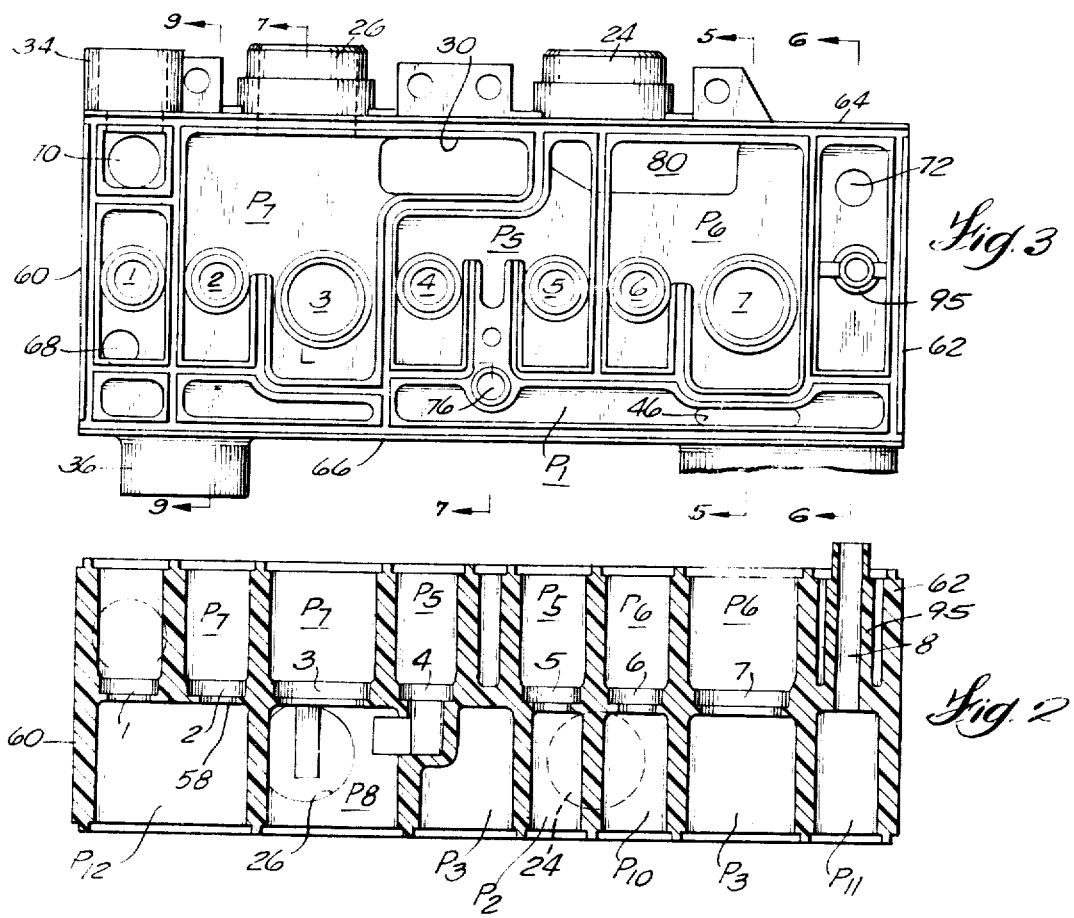
Fig. 3
Fig. 2
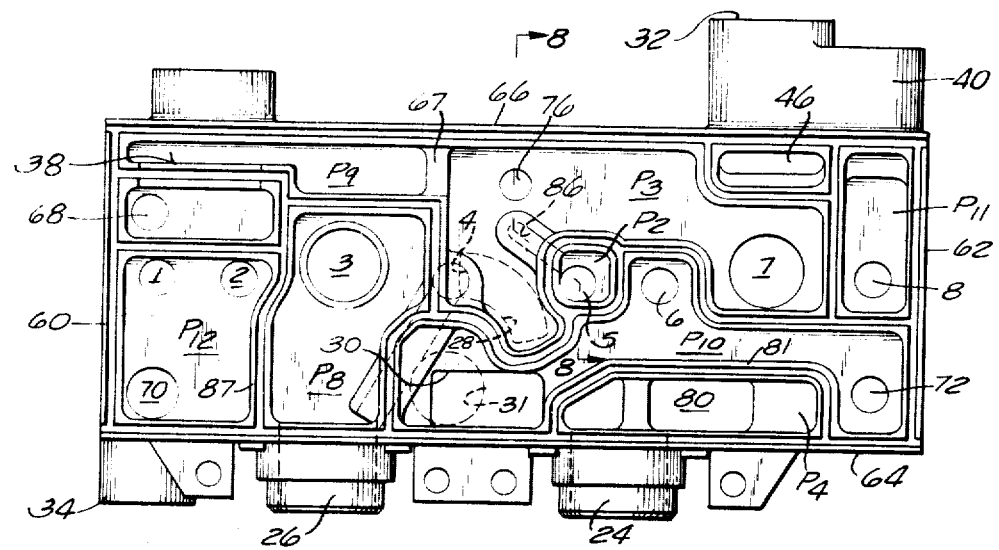
Fig. 4

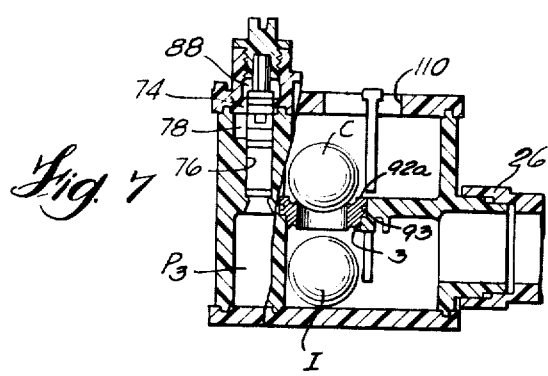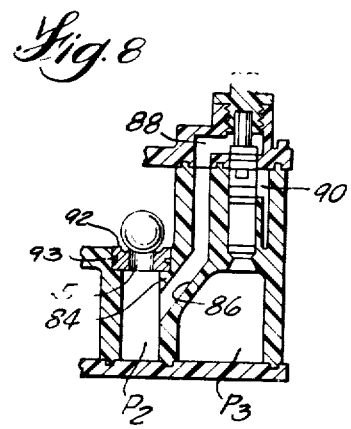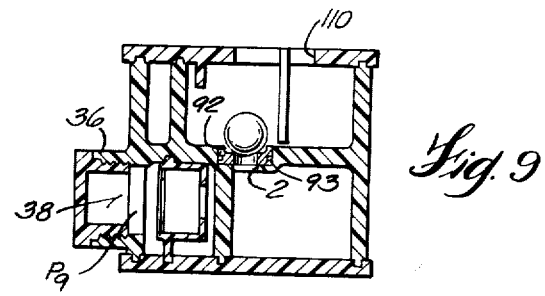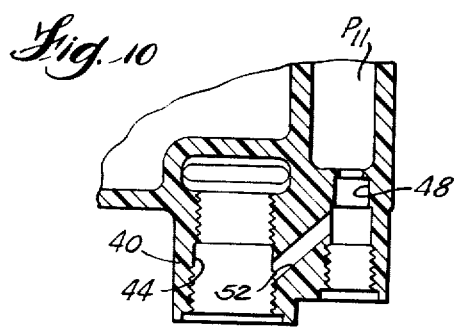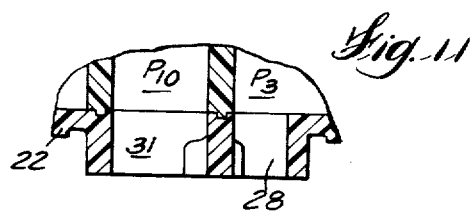

WATER SOFTENER VALVE

This is a division, of application Ser. No. 196,621, filed Nov. 8, 1971, now U.S. Pat. No. 3,794,061.

BACKGROUND OF INVENTION

This invention relates to water softener valves and, more particularly, to the control valve arrangement by means of which the various water softener cycles are achieved.

Conventional water softeners are generally programmed to operate automatically through the well known cycles of service, backwash, brine slow rinse, fast rinse, and brine tank water refill. This programmed operation is achieved by means of a control valve which directs the flow of source water to the mineral tank and brine tank, soft or hard water to the service outlet, and unwanted water (during backwash and rinses) to drain. Numerous control valves have been proposed in the past, the construction of such valves have varied but the function has remained generally the same, namely to achieve the above mentioned cycles.

SUMMARY OF INVENTION

This invention is directed to the problem of providing the water softener cycles and, among its general objects, is to provide a simplified and effective control valve by means of which such cycles can be achieved.

For the achievement of that and other objects, this invention proposes a construction wherein a ball is associated with each of a number of the valve ports in the valve. The balls normally close the ports to flow and are displaced from their respective ports in a programmed fashion. The ports are preferably located in a generally common wall with walls projecting from both sides of the common wall in preselected orientation to define channels associated with the ports through which flow occurs. The balls are selectively unseated to open the ports to influence flow through the valve, and to and from the brine and mineral tanks, to produce the various operational cycles. The control valve also has suitable connections between its interior channeling and a water source, a service connection, the brine and mineral tanks, and a drain.

The ball arrangement affords a simplified and yet highly effective valving arrangement. The balls are generally free in the area of their respective ports and the seating surface of each ball in its port will be continuously changing throughout valve operation thereby insuring positive and effective seal-off over extended periods of service which increases reliability and reduces maintenance attention. Preferably, the balls being free at their respective ports, are urged into seating relationship in their respective ports only by water pressure; this allows the balls to rotate while disengaged from their seats thereby changing the valve seating surface from one operation to another. More specifically, the channeling within the valve is such that balls exposed to water flow are generally exposed from above relative to their respective ports so that they are urged into engagement in their respective ports by water, and the balls are preferably heavier than water to enhance this inherent biasing effect. Where a port is exposed to water flow on both sides two balls can be provided to insure port closure; for example, in the preferred embodiment during operation one port is exposed on its underside to flow to service while its upperside is exposed to flow to drain and a second ball capable of floating is provided on the underside of that port.

Also in the preferred arrangement, the balls are manipulated by levers extending through resilient discs supported in the valve housing. The levers are normally spaced from the balls and the discs are stressed as the levers move to unseat the balls so that the inherent bias of the discs moves the levers away from the balls when the ports are to be closed.

Other objects and advantages will be pointed out in or be apparent from the specification and claims, as will obvious modifications of the embodiments shown in the drawings, in which:

FIG. 2 is a longitudinal section through the main portion of the control valve with operational parts removed for ease of illustration;

FIG. 3 is a top plan view of the structure shown in FIG. 2;

FIG. 4 is a bottom plan view of the structure shown in FIG. 2;

FIG. 7 is a section view taken generally along line 7—7 in FIG. 3;

FIG. 8 is a section view taken generally along line 8—8 of FIG. 4;

FIG. 9 is a section view taken generally along line 9—9 of FIG. 3;

FIG. 10 is a section view taken generally along line 10—10 of FIG. 6 and with operational parts removed; and FIG. 11 is a partial view of a part of the bottom section of the valve illustrating the openings through which connection is made to the mineral tank.

DESCRIPTION OF PREFERRED EMBODIMENT

Figure 5:
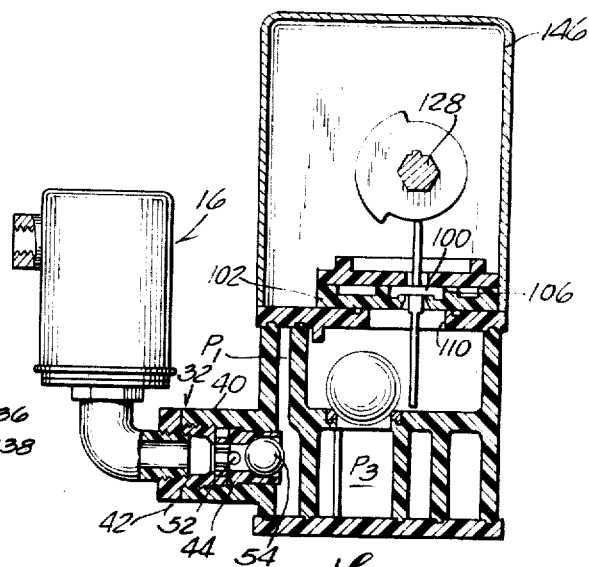
FIG. 5 is a section view taken generally along line 5—5 in FIG. 3.

A water softener valve 10 is illustrated in the drawings and includes a valve body 12, a rotatable cam bank 14, a brine flow check valve 16 (FIG. 5), and suitable connections (not shown) to the brine tank and the mineral tank which contains the conventional ion exchange material such as zeolite. The mineral tank and the brine tank can be any conventional construction and neither is necessary to an understanding of this invention and hence they have not been illustrated and will not be described; this is also true of the brine flow check valve and it will not be described in detail. It should also be appreciated at the outset of this description that, in addition to the just mentioned tanks, much of the system elements and connections are also conventional, e.g., the connections to the mineral and brine tanks, and hence, although they may be referred to in a general manner herein, they too will not be described in detail as their construction and operation should be readily understood by those skilled in this art.

Figure 1:
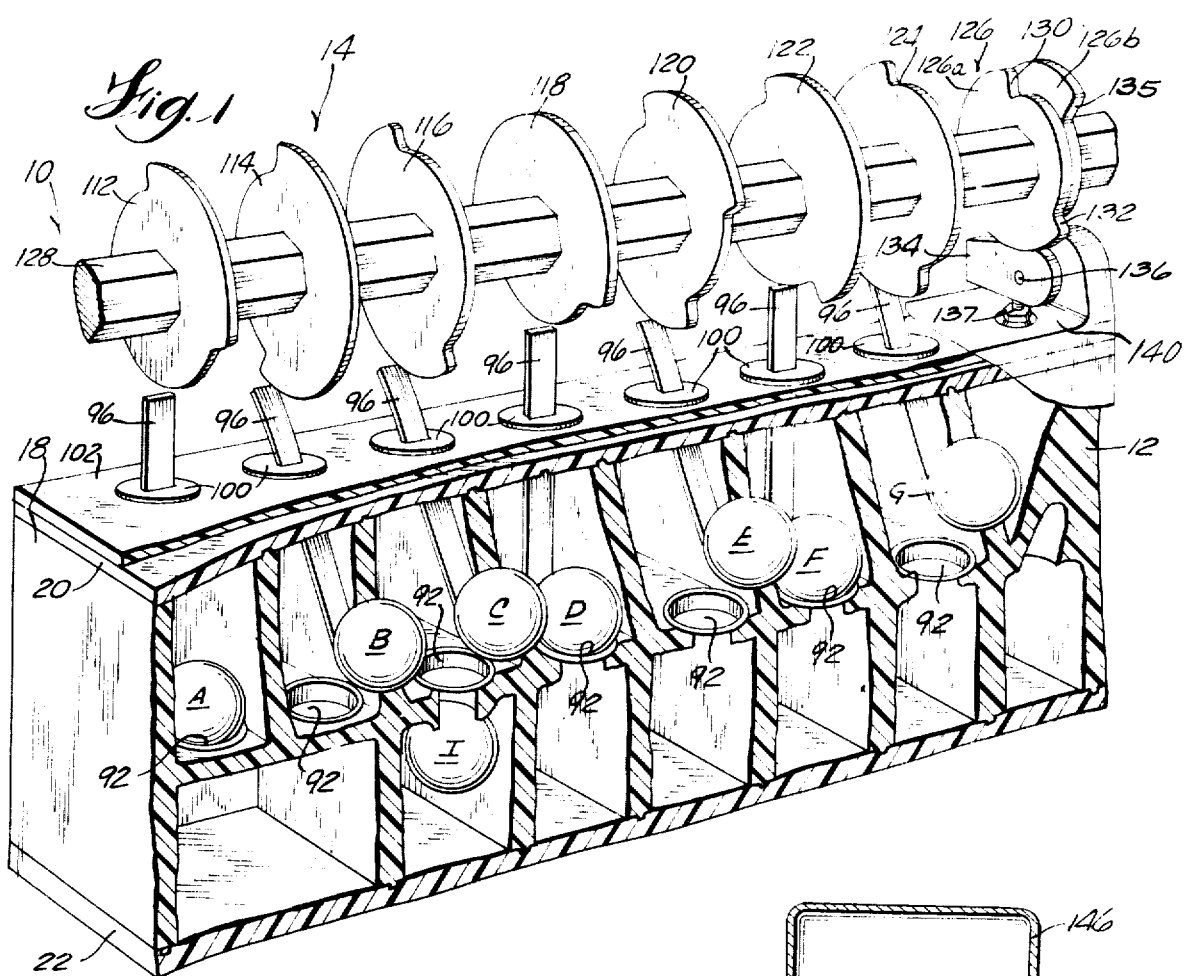
FIG. 1 is a perspective of a control valve embodying this invention with parts broken away to illustrate the interior of the valve and being somewhat in schematic form so as to better illustrate the operation of the overall valve.
Figure 6:
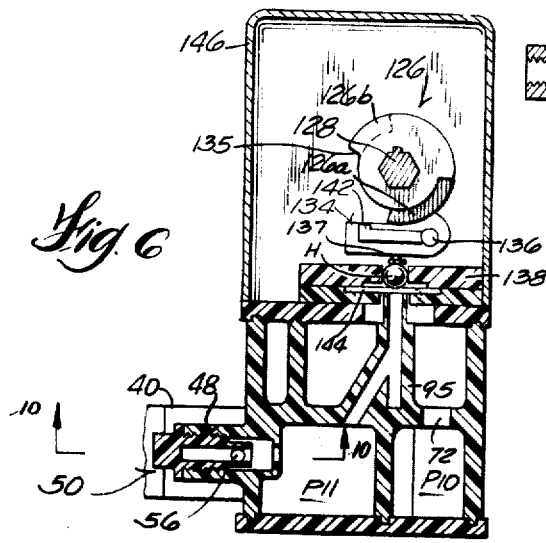
FIG. 6 is a section view taken generally along line 6—6 of FIG. 3.

Valve body 12 is basically a three piece member including a main section 18, a top wall 20, and a bottom wall 22. The body pieces are made of a suitable plastic material, for example a plastic presently available commercially as Acrylafil 640–35 provides satisfactory results. The pieces 18, 20, and 22 are connected by a suitable bonding adhesive and a tongue-in-groove type connection to provide a leak proof seal for the interior of the valve body. FIG. 1 is somewhat of a general showing of the valve eliminating some details of constructions which have, however, been illustrated in other FIGS.

In general terms, main section 18 includes an inlet port 24 in sidewall 64 for entry of hard water; an outlet port 26 also in sidewall 64 for exit of soft water for system usage; an opening 28 opening in bottom wall 22 (shown in dotted lines in FIG. 4 and in section in FIG. 11) through which hard water is directed to the mineral tank for treatment; an opening 30 in central wall 58 and generally aligned with an opening 31 through bottom wall 22 through which soft water returns to the valve; port 32 in sidewall 66 through which brine is drawn from the brine tank to be channeled through the valve to the mineral tank and through which replacement water is directed to the brine tank; and an outlet 34 in sidewall 64 connected to drain for discharge of water during, for example, the fast and slow rinse cycles for the mineral bed. Hub 36, extending laterally from sidewall 66, is adapted to receive a flow regulator valve 38, commonly referred to as a dole valve and which maintains a constant volume flow rate to drain outlet 34. Hub 40, in which port 32 is formed, includes a check valve assembly 42 positioned in bore 44. Port 32 communicates through the check valve and opening 46 in wall 58 with passage $P_1$ and this channeling is used in directing brine from the brine tank to the mineral bed for regeneration as will be described hereinafter. Hub 40 includes a second bore 48 which carries a valve 50 (in FIG. 10 the assemblies in the bores have been removed for purposes of illustration). Bore 48 communicates with bore 44 through a cross passage 52 which enters the bore 44 behind ball 54 of the check valve assembly 42. This channeling is utilized to direct water to the brine tank for refilling the brine tank after the mineral bed regeneration cycle. There is sufficient clearance between the valve member 50 and the inner walls of bore 48 to permit flow to passage 52.

Wall 58 of main valve section 18 is disposed in a generally central location in the valve and extends between end walls 60, 62, and side walls 64, 66, the central, end and side walls being molded in one piece. The central wall carries the control valve ports, numbered 1 through 8 in the drawings, through which flow is directed as a result of selective opening of the ports by operation of the cam bank. Vertical walls are also provided and project on both sides of wall 58 and function to define flow channels associated with the ports for directing water in a manner which will become evident as this description proceeds, the walls will be numbered as required in the description.

Wall 58 also includes holes 68 and 70 which communicate with each other via channeling and port 1 and hole 72 which is operationally between ports 6 and 8 and in the flow channeling to the brine tank.

Ejector assembly 74 (FIGS. 7 and 8) is mounted in bore 76 and communicates with passage 78. Passage 78 has open communication with passage $P_1$ which communicates through opening 46, check valve assembly 42 and brine check valve 16 with the brine tank. Ejector 64 is operative to create a vacuum through the passages just described, i.e., $P_1$ and 46, causing ball 54 to be removed from its seat and brine to be drawn from the brine tank. To produce the vacuum, the ejector is exposed to the main water flow through inlet 24 via opening 80 in wall 58, port 5, hole 82 in the sidewall 84 communicating with passage $P_2$ below port 5, channel 86, channel 88 and down through ejector 74 into passage $P_3$ which communicates with opening 28 in bottom wall 22 to tank. A venturi effect is created by this flow through the ejector in area 78 which creates the vacuum condition described above causing brine to be drawn from the brine tank and mixed with the water being directed into the tank through the ejector.

Ports 1–8 are normally closed and are selectively opened for flow to achieve the conventional cycles of service, backwash, brine slow rinse, and fast rinse during which the brine tank is also refilled. In accordance with this invention, the closure of ports 1–7 is achieved by balls A–G one of which is associated with each of the ports as illustrated in FIG. 1. Each of the balls A–G is made of a material heavier than water so that they do not float, for example glass. Port 8 is closed by the combination of metal ball H, disc 144, and lever 134, a positive seal off is achieved at this port where even a small amount of leakage cannot be tolerated. Each of the ports 1–7, which cooperate with a glass ball, is provided with a removable seat member 92 of suitable material which is positioned in a respective port and provides a seat for receiving a respective ball A–G. The seats 92 fit into each port and have an O-ring 93 associated therewith to insure a seal. It will be noted that seat 92a at port 3 is a double seat to cooperate with both balls C and I. Being removable the seats can be removed and replaced during service as desired.

Disc 144 is made of rubber, or the like, and seats directly on the end of extension 95 which forms port 8 and is held in place by ball H and lever 134. Balls A–G are all located above wall 58 as viewed in FIGS. 1 and 2 and, as will appear when the operational cycles are explained, the passages and channeling influencing flow direct all flow such that flow to a port when it is to be open and pass flow is from above wall 58. This produces flow over the balls tending to seat the balls in their respective ports. Thus water pressure urges the balls into the ports and they must be positively displaced to open the ports and when released are returned to engagement in their ports under the influence of the water. A second ball I is associated with port 3 and is located on the underside of wall 58. During a portion of the overall softener program port 3 is exposed to flow on both sides and the purpose of ball I is to insure closure of port 3. This flow above and below port 3 occurs during the backwash, brine, and rinse cycles. Ball I is generally made of a material which will float (e.g., polypropylene) so that it will normally try to assume a position seated in and closing port 3. However, when flow occurs down through port 3 it is readily displaced. Ball H holds disc 144 on port 8 and when that ball is released by lever 134 the inherent water pressure under the disc raises the disc to open the port.

The use of balls to control opening and closing of the ports provides a very simple and yet markedly reliable valve arrangement. Positive seal-off is insured, and without the need for precise location of the valve closure member with respect to the port. Furthermore, the balls at ports 1–7 are generally free once released from the port and can rotate virtually without restriction so that seal-off does not occur through repeated engagement between the port and the same surface on the valve closure member. This minimizes problems due to wear and decreases the need for maintenance attention while increasing valve reliability.

It should be noted at this point that having provided a common wall 58 for the valve ports, and that wall being generally horizontal in use, contributes in permitting the use of the simple valve closure arrangement provided by the balls. Although port 8 is elevated above the level of ports 1–7 this can still be considered for practical purpose, as part of the common wall as the elevation of the upper part of the port 8 is merely to facilitate actuation.

As stated above balls A–G normally tend to assume a position seated in their respective ports and a relatively simple arrangement is proposed for unseating the balls to open their respective ports. Being unable to float and disposed over the upperside of wall 58, which is normally horizontal, and with influenced flow being over the balls, the balls are biased into engagement in their respective ports without the use of springs. Although springs can be used, the free movement of the balls when released from the ports is preferred.

More specifically, the arrangement for unseating the balls includes a number of levers 96 extending through top section 20 for engagement with balls A–G. Levers 96 are rigid members of a suitable metal, such as brass, and are held captive in resilient discs 100 seated in a plate 102 overlying top section 20. Levers 96 are vulcanized to the discs providing a sealed connection, discs 100 are in turn seated in openings 106. The levers extend through clearance openings 110 in top section 20. Discs 100 are made of resilient material, e.g., rubber, and the inherent bias of these discs cause levers 96 to assume a generally upright position, spaced from, i.e., not in contact with, their respective balls A–G. The resilient discs oppose movement of the levers in a port opening direction and return the levers to the upright position after the opening force is removed. To properly orient the levers relative to the balls, a notch and projection arrangement is provided between discs 100 and openings 106 locating the discs and thereby orienting the levers.

Movement of the levers to engage and unseat the balls is achieved by cams 112, 114, 116, 118, 120, 122, 124, and 126 as can be seen in FIG. 1. Cams 112–126 are provided with suitable cam lobes to engage and move the levers and all are mounted on a shaft 128 which is driven by a timer (not shown) programmed to cycle the cams to achieve the necessary water softener cycles. As the shaft 128 is rotated, cams 112–126 selectively operate their respective levers 96, and 134, to pivot the levers into engagement with and move the balls against water pressure to unseat the balls as required to achieve the various water softener operations. In the case of lever 134, ball H is moved to free disc 144.

At this point the construction of cam 126 and its operative connection to lever 134 should be noted. As illustrated, cams 112–124 carry lobes and the rise portion of the cams are used to operate their respective levers to displace balls A–G. In contrast, cam 126 is adapted to operate its lever 134 on a fall portion of the cam and hence a lever arrangement has been provided to accommodate this reversal of this operation. Moreover, cam 126 is intended to control the brine tank refill cycle and, therefore, is made adjustable to provide the prescribed amount of water to recharge the brine tank after the brine cycle. More specifically, cam 126 includes a first cam disc 126a and a second cam disc 126b. Cam disc 126a is fixed to shaft 128 whereas disc 126b can be rotated relative to the shaft whereby the cam fall opening can be set at a maximum where faces 130 and 132 of disc 126a are both exposed but can be reduced by exposing face 135 and moving that face toward face 132.

Lever 134 is supported on a pin 136 for pivotal movement. Lever 134 includes a projection 142 which rides on the rise portion of cam 126 and holds lever 134 such that ball H urges disc 144 into engagement with port 8. When projection 142 falls into the opening defined between surfaces 130 and 132 or 135 and 132, spring ball H is released and the water pressure under disc 144 lifts the disc to open port 8.

It will also be noted that cover plate 140 serves to hold resilient discs 100 and 104 in their respective openings, this cover plate and outer housing 146 were removed in FIG. 1. Cover plate 140 is attached to member 102 and member 102 to top section 20 by a suitable adhesive.

Screw 137 is threaded into lever 134 and makes the actual engagement with ball H to thereby provide a measure of adjustment in the force with which the disc closes port 8.

With this structural description of the overall valve in mind, a general description of the operation of the valve through the various water softener cycles in a complete water softener program will now be made. Starting with the service cycle and assuming that the zeolite bed is properly conditioned for softening and that the brine tank is properly charged with water and salt, cams 116 and 124 will have moved balls C and G to open ports 3 and 7. During the service cycle only ports 3 and 7 are open and all other ports are closed. Hard water enters inlet 24 and inlet 24 opens into passage $P_4$ which is isolated from the underside of wall 58 by wall 81. Inlet water must then flow up through opening 80 on both sides of wall 83 into passages $P_5$ and $P_6$. This exposes ports 4, 5, 6, and 7 to inlet flow at all times. Port 7 being the only one that is open, water flows down through port 7 to passage $P_3$ from which it is directed to and through opening 28 to the zeolite bed in the mineral tank. Soft water returns from the mineral tank through opening 31 into passage $P_{10}$ up through opening 30 into passage $P_7$ and down through open port 3 (the water flowing through port 3 will unseat ball I), into passage $P_8$, and out service outlet 26 to provide soft water as required.

The service cycle will continue until the point is reached wherein the zeolite bed requires regeneration. The first step in regeneration is a backwash cycle which produces a reversed flow through the zeolite bed to loosen the bed. At this point the levers associated with balls C and G are moved from engagement with those balls allowing the balls to seat in and close ports 3 and 7. Cams 112, 118, and 122 engage their operating levers to displace balls A, D, and F and open ports 1, 4, and 6, all other ports remain closed. With this arrangement, hard water entering inlet 24 again flows through opening 80 but, in this instance, it proceeds to port 6 and down into passage $P_{10}$ which communicates with opening 31, ports 2 and 3 also having open communication with Passage $P_{10}$ through opening 30 being closed, flow proceeds directly to the bottom of the mineral tank so that the hard water is directed from the bottom of the tank up through the zeolite bed to loosen the bed. This water returns to the valve through opening 28, into passage $P_3$. Port 1 being open return flow is now directed through vertical wall opening 67, passage $P_9$, valve 38, and up through opening 68. The water flows upwardly through opening 68 then proceeds down through open port 1 into passage $P_{12}$ and up again through opening 70 to be discharged through outlet 34 to drain.

Port 4 is also open during the backwash cycle and this port has direct communication with hard water entering inlet 24 through opening 80. The hard water passes from opening 80 through passage $P_5$ and port 4 which has open communication with the underside of port 3 through channel 4a so that hard water can flow directly to and through service outlet 26 to meet water demands during the backwash cycle. It will be understood that port 4 remains open throughout the regeneration cycle to provide hard water service at this time. In accordance with conventional practice, the regeneration cycle takes place during the early morning hours so that the lack of soft water is not critical and hard water is sufficient to satisfy the demands at that time. Moreover, it will be noted that ball I will be urged toward its seat in port 3 to insure closure of that port during the backwash cycle.

After the backwash cycle, the actual regeneration starts as the brine slow rinse cycle takes place. During this cycle, ports 2 and 5 are open, cams 114 and 120 having engaged and pivoted levers 96 to displace balls B and E, that is in addition to port 4 being open to maintain hard water service. All other ports are closed during this cycle. It is necessary to draw the brine from the brine tank. To accomplish this, hard water entering inlet 24 is directed to ports 4 and 5 through passage $P_5$. Hard water flows down through port 5, through wall opening 82 and up through passage 86 to area 88 from which it is directed down through ejector assembly 74. The hard water passes through the ejector assembly directly into passage $P_3$ and out opening 28 to the mineral tank. In passing through ejector 74, a vacuum is created in area 78, creating a vacuum through passage $P_1$, opening 46, and in the area of check valve 42. A pressure drop occurs across ball 54 of the check valve unseating the ball and causing brine to be drawn from the brine tank through the brine check valve and port 32. The brine is mixed with the water being discharged into the mineral tank and flows down through the zeolite bed. This will continue until the brine solution has been completely drawn from the brine tank at which time the conventional brine tank flow check valve will operate to interrupt communication between the valve, specifically port 32, and the interior of the brine tank. The brine circulates through the zeolite bed and returns to the valve through the opening 31. From passage $P_{10}$ return flow proceeds through opening 30 to passage $P_7$ down through port 2 to passage $P_{12}$ (which is isolated from passage $P_8$ by wall 87). Port 2 communicates with opening 70 so that the brine solution flows up through opening 70 to and through drain outlet 34.

After completion of the brine slow rinse cycle, a fast rinse cycle is provided. This fast rinse cycle is achieved by cam 114 remaining in engagement with its lever 96 to hold ball B away from port 2 and cam 124 engages its lever 96 to displace ball G from port 7 so that ports 2 and 7 are open, together with port 4 which maintains hard water service. With this arrangement hard water enters inlet 24, a portion thereof flowing to service through port 4 and another portion flowing through port 7 and from port 7 through passage $P_3$ and opening 28 to and through the zeolite bed. It will be noted at this point that port 7 is larger than port 5 so that a greater quantity of water is being directed through the bed during fast rinse as compared to slow rinse. Hard water passes down through the bed and returns as soft water through opening 31 to passage $P_{10}$ and through opening 30 and passage $P_7$ to open port 2, which having open communication with hole 70, allows the rinse water to proceed directly through outlet 34 to drain. Upon the completion of the fast rinse cycle, the valve operates to establish a service setting and service of soft water is resumed as described previously and until a subsequent regeneration cycle is called for.

One other operational cycle is to be described and that is the brine refill cycle. During the fast rinse cycle when ports 2 and 7 are open, cam 126 has also been rotated to allow lever 134 to pivot and ball H to be displaced by disc 144 and open port 8. Water entering inlet 24 passes from opening 80 through port 7 and to passage $P_3$ to be directed to the zeolite bed in the mineral tank as described above. During the fast rinse cycle, cam 122 will have engaged and operated its lever 96 to displace ball F from port 6. Port 6 being open, hard water is permitted to flow from inlet 24 and opening 80 down through port 6 to passage $P_{10}$ on the underside of opening 72 which has open communication with port 6. This water flows up through opening 72 and down through open port 8 into passage $P_{11}$ and to valve 50 in bore 48. From valve 50 this water proceeds through passage 52 to the check valve assembly 42, entering the check valve assembly behind ball 54 so that the water can be directed into the brine tank. Ball 54 is held closed in that it is exposed on its right side to inlet pressure. From the check valve water flows to the brine tank. Adjustable cam 126 will determine the length of time that port 8 remains open and when the amount of water necessary to fill the brine tank has been supplied, ball H will be moved toward and will reseat disc 144 in port 8 closing that port and interrupting the refill cycle. It will also be noted that port 6 is at times exposed on its underside to return flow from the mineral tank but the upperside of port 6 is at all times exposed to inlet pressure in passage $P_6$, which will be greater, and hence is held closed.

Although but several embodiments of this invention have been illustrated and described, it will be apparent to those skilled in the art that various other modifications may be made without departing from the spirit of this invention or from the scope of the appended claims.

We claim:

1. A fluid valve comprising in combination,
   means defining a housing,
   a source inlet and a service outlet each opening into the interior of said housing,
   at least one port within said housing, the fluid flow through said fluid valve depending on the selective opening of said port,
   a generally spherical valve member freely positioned at said port and positioned on that side of said port so that normal flow through the valve urges said valve member against its respective port, and
   deflection means protruding through said housing, said deflection means having an end portion within said housing said end portion being movable from a first position spaced apart from said valve member to a second position, movement of said end portions from said first to said second position causing unseating of said valve member to a position spaced laterally from the axis of said port, movement of said end portions from said second to said first position permitting release of said valve member to the influence of fluid flow through said housing to cause reseating of said valve member, whereby the port sealing surface of said valve member is reoriented relative to said port when said valve member is reseated against its port.

2. The fluid valve as claimed in claim 1 wherein said end portion of said deflection means is adapted to contact said valve member at a point spaced laterally from the axis of said port when said end portion is moved from said first to said second position.

3. The fluid valve as claimed in claim 1 wherein said end portion of said deflection means is located on the valve member side of said port.

4. The fluid valve as claimed in claim 1 wherein said valve member deflection means includes an elongated means and means biasing said elongated means to said first position and opposing movement of said end portion of said elongated means to said second position.

5. The fluid valve as claimed in claim 4 wherein said elongated means consists of a lever.

6. The fluid valve as claimed in claim 5 wherein said biasing means is a resilient member mounted on a wall of said housing and said elongated means extends through said resilient member.

* * * * *